United States Patent
Knipfer et al.

(10) Patent No.: US 7,437,205 B2
(45) Date of Patent: Oct. 14, 2008

(54) METHOD FOR MANUFACTURING WITH ENGINEERING CHANGE OVERRIDE

(75) Inventors: Ivory Wellman Knipfer, Rochester, MN (US); Fraser Allan Syme, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 11/466,190

(22) Filed: Aug. 22, 2006

(65) Prior Publication Data

US 2008/0051923 A1  Feb. 28, 2008

(51) Int. Cl.
 *G06F 19/00* (2006.01)
(52) U.S. Cl. .................. 700/106; 700/100; 700/105; 705/8
(58) Field of Classification Search .......... 700/95, 700/99, 100, 102, 103, 105–107; 705/1, 705/8, 9, 28, 29
See application file for complete search history.

(56) References Cited

U.S. PATENT DOCUMENTS

| | | | | |
|---|---|---|---|---|
| 5,099,431 | A * | 3/1992 | Natarajan | 700/105 |
| 5,216,612 | A |  6/1993 | Cornett et al. | |
| 5,311,424 | A * | 5/1994 | Mukherjee et al. | 705/29 |
| 5,315,509 | A * | 5/1994 | Natarajan | 705/28 |
| 5,574,640 | A | 11/1996 | Sycara et al. | |
| 5,777,877 | A |  7/1998 | Beppu et al. | |
| 6,041,267 | A |  3/2000 | Dangat et al. | |
| 6,064,982 | A |  5/2000 | Puri | |
| 6,594,535 | B1 |  7/2003 | Costanza | |
| 7,103,434 | B2 * |  9/2006 | Chernyak et al. | 700/98 |
| 7,200,454 | B2 * |  4/2007 | Coppola et al. | 700/105 |
| 2004/0059615 | A1 |  3/2004 | Byrer et al. | |
| 2005/0055260 | A1 * |  3/2005 | Yamamoto | 705/8 |
| 2005/0065833 | A1 * |  3/2005 | Okaji et al. | 705/8 |

(Continued)

FOREIGN PATENT DOCUMENTS

EP      0425406 A2    2/1991

OTHER PUBLICATIONS

Folmar et al., "Automated Management and Control of an Engineering Change", IBM Technical Disclosure Bulletin n4a, Sep. 1992, pp. 189-194.

*Primary Examiner*—Albert Decady
*Assistant Examiner*—Douglas S Lee
(74) *Attorney, Agent, or Firm*—Duke W. Yee; Gregory M. Doudnikoff; Peter B. Manzo

(57) ABSTRACT

The illustrative embodiments provide a computer implemented method, apparatus, and computer usable program code for processing orders. A request for delivery by a requested delivery date is received for an order having an original delivery date. The ordered product is broken down into one or more materials required for manufacturing the ordered product. For at least one material required for manufacturing the ordered product, a date when an engineering change becomes effective for the material is specified. An alternate bill of materials is created based on the specified date when the engineering change becomes effective for the material. An alternate manufacturing plan based on the alternate bill of materials is created. Manufacturing is initiated based on the alternate manufacturing plan. If manufacturing can be completed in time for delivery by the requested delivery date, the original delivery date of the order is replaced with the requested delivery date.

9 Claims, 7 Drawing Sheets

U.S. PATENT DOCUMENTS

| | | |
|---|---|---|
| 2005/0090921 A1 | 4/2005 | Denton et al. |
| 2005/0261887 A1 | 11/2005 | Chen et al. |
| 2007/0239304 A1* | 10/2007 | Orzell .......................... 700/106 |
| 2007/0265959 A1* | 11/2007 | Hollis et al. ................... 705/38 |

* cited by examiner

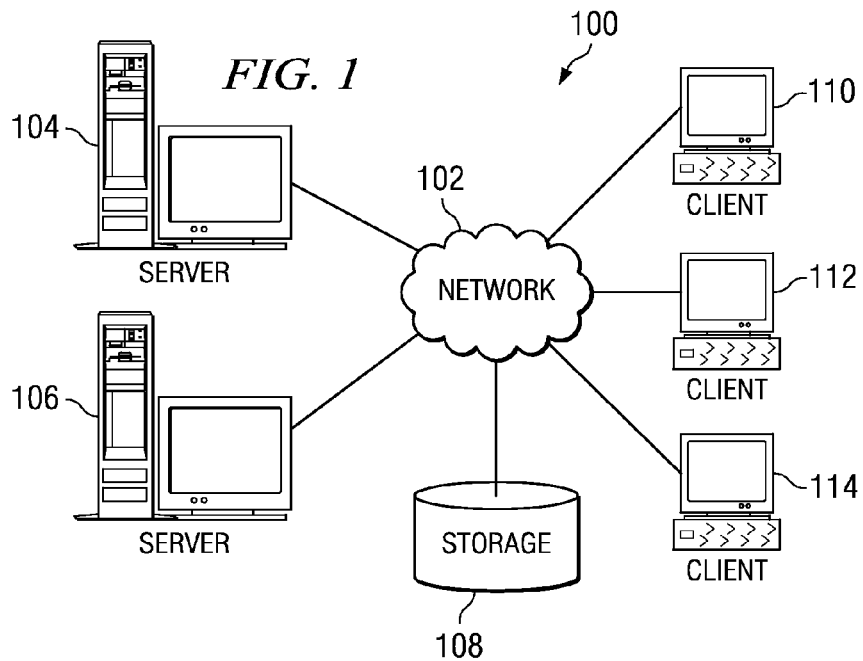
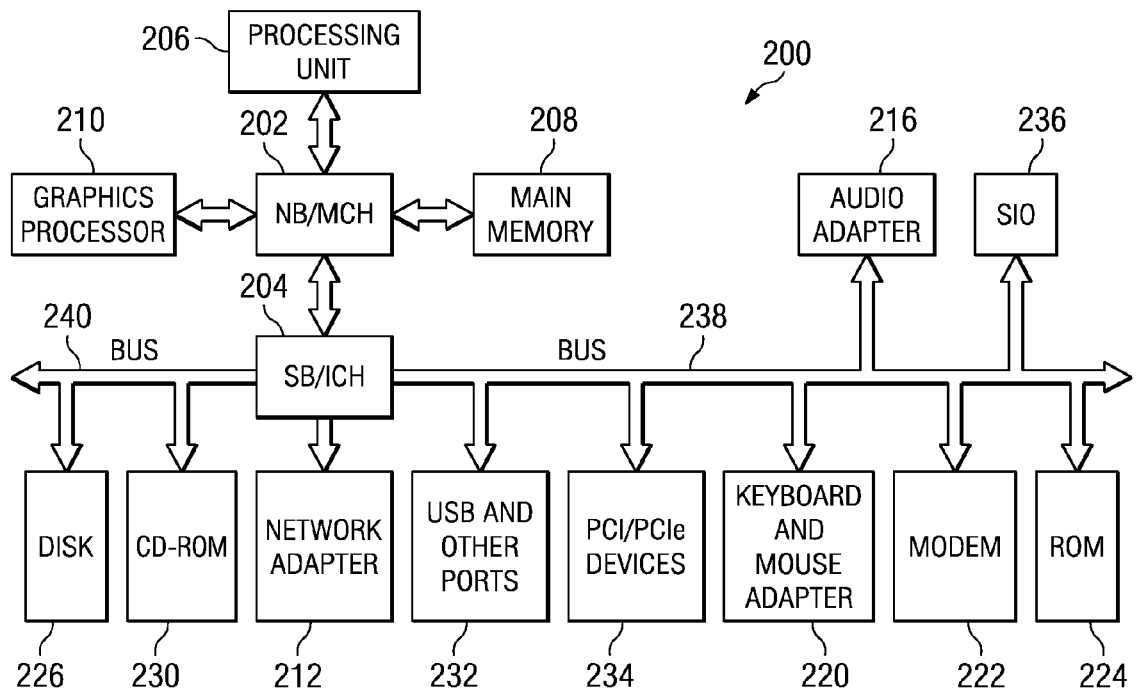

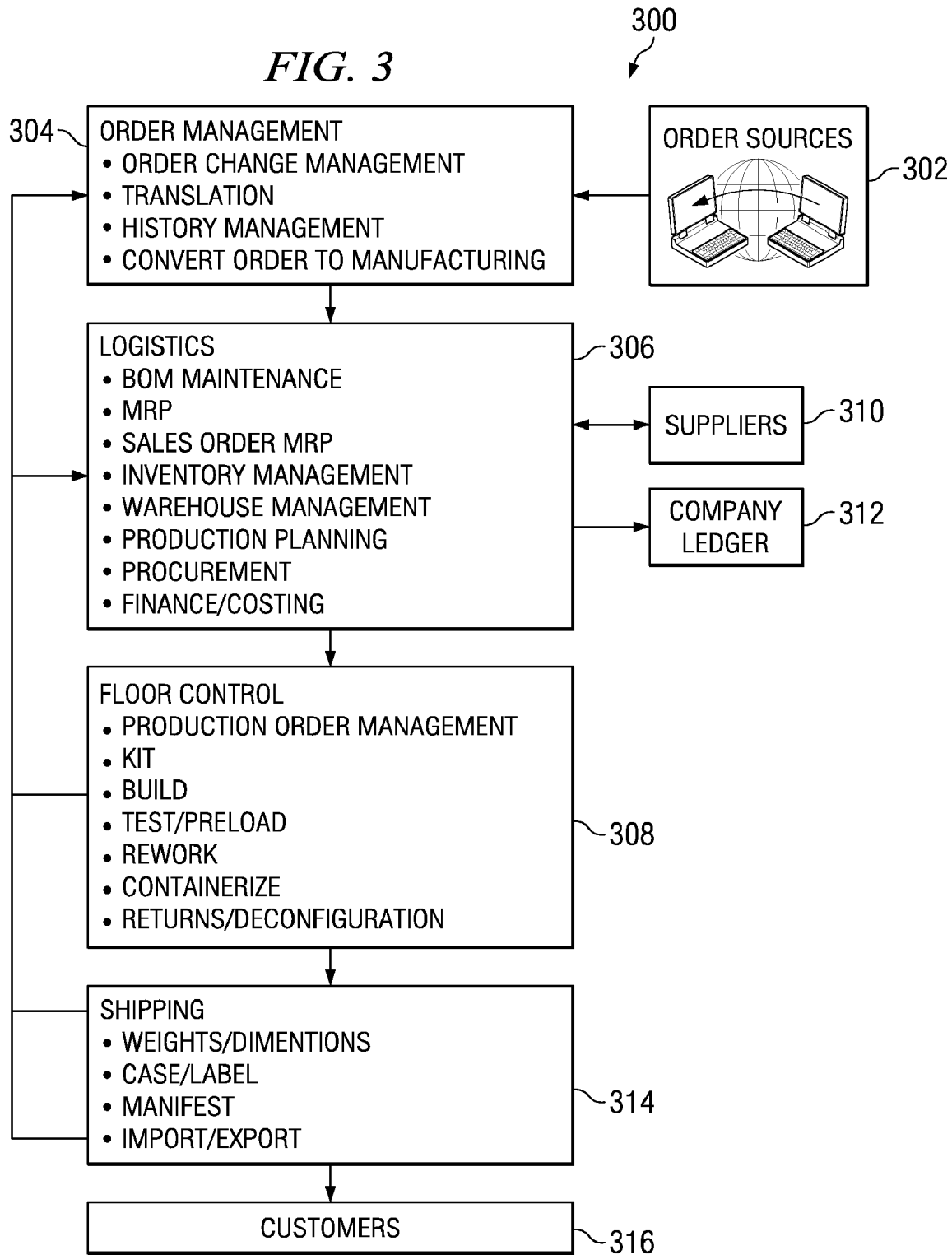

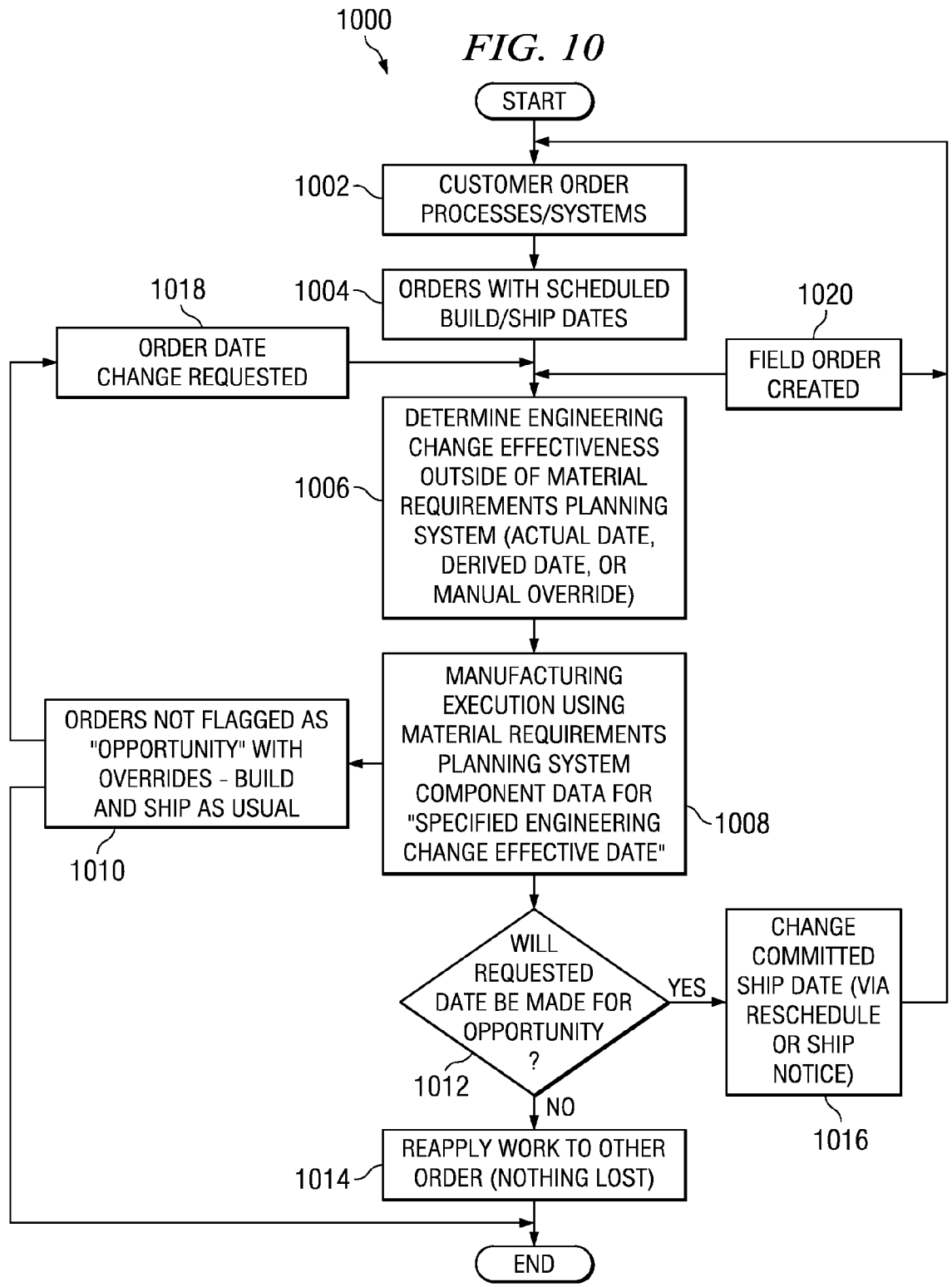

METHOD FOR MANUFACTURING WITH ENGINEERING CHANGE OVERRIDE

BACKGROUND OF THE INVENTION

1. Field of the Invention

The present invention relates generally to an improved data processing system, and in particular, to a computer implemented method, apparatus, and computer usable program code for an improved dynamic manufacturing process. Still more particularly, the present invention is related to an improved dynamic manufacturing process using engineering change date overrides to support upside potential opportunities.

2. Description of the Related Art

Customers place orders for products that must be manufactured once the order has been placed. Customers determine the specifications for the order and have expectations as to the dates by which the order will be delivered. For timely manufacturing and delivery of the order, a significant amount of planning, preparation, and procurement procedures are involved in the production process.

In a typical production process, order management systems, production planning systems, and warehouse management systems form some of the essential systems that determine a number of procedural steps. First, these systems determine whether the order can be accepted as placed. An order may not be acceptable for a number of reasons, such as customer status or contractual issues. After the systems determine that an order is acceptable, the systems have to determine whether the order can be manufactured as specified. An acceptable order may not be capable of fulfillment for reasons such as non-compatibility of specified parts. Next, the systems check for the feasibility of the order's delivery requirements. Several factors can affect delivery of an order that can be manufactured, for example, timely availability of all parts, availability of manufacturing capacity, and sufficiency of time in transit for shipping.

Often, customers have other dependencies on the ordered product on the customers' end as well. For example, a customer may be in an engagement that may not be completed without using the ordered product. Change in the downstream dependencies can trigger a request for change in the order by the customer. In a complex coordination of manufacturing systems and processes, of which the above description is a simplistic view, change management is crucial. Any change to an order must follow a process through the various systems similar to the process described above. Following the above process is necessary for the changed order to be acceptable, capable of being manufactured, and deliverable. For example, an otherwise deliverable order may become incapable of being manufactured due to a change of specification.

A change that customers commonly request is a change in delivery date. Frequently, customers request the delivery date to be advanced rather than delayed. A delivery date change alters the entire manufacturing plan. Some of the cascading affects of a delivery date change are that the planned materials must arrive earlier, the warehouse space must be available sooner, and the manufacturing facility must become available earlier, causing rescheduling of other planned orders and affecting the deliverability of those orders.

Similar situations arise when the sales force speculates that a customer may be ready to place an order. In such cases, the sales force may need a delivery date from manufacturing, which the sales force can promise to the customer and close the sale.

Presently, a request for change in delivery date is a process that requires a commitment to the requested delivery date in the systems involved in the production process. This commitment must occur before the manufacturing facility can determine if the order can be manufactured and delivered by the requested delivery date. If the requested delivery date is found to be unworkable in any step of the manufacturing planning process, the result is embarrassment from failure to deliver, and may cause a loss of the sales opportunity. Similarly, estimation of delivery date that the sales force may need must first be committed to in the systems before the date's feasibility can be determined.

BRIEF SUMMARY OF THE INVENTION

The illustrative embodiments provide a computer implemented method, apparatus, and computer usable program code for processing orders. A request for delivery by a requested delivery date is received for an order having an original delivery date. For at least one material required for the order, a date when an engineering change becomes effective for the material is specified. An alternate bill of materials is created based on the specified date when the engineering change becomes effective for the material. An alternate manufacturing plan based on the alternate bill of materials is created. A manufacturing operation is initiated based on the alternate manufacturing plan.

In these illustrative embodiments, the order can be a customer order, or a field order. The requested delivery date is earlier than the original delivery date.

In these illustrative embodiments, a component responsible for material requirements planning performs the function of specifying the date when the engineering change becomes effective for the material. The component responsible for material requirements planning also performs the function of creating the alternate bill of materials and the alternate manufacturing plan. A component responsible for manufacturing performs the function of initiating the manufacturing operation based on the alternate manufacturing plan.

In these illustrative embodiments, if the manufacturing operation can be completed by the requested delivery date, the requested delivery date is committed to for the order. The original delivery date is also updated with the requested delivery date. If the manufacturing operation can be completed by the requested delivery date, the original manufacturing plan is replaced with the alternate manufacturing plan.

If the manufacturing operation based on the alternate manufacturing plan cannot be completed by the requested delivery date, the original delivery date is left unchanged and the order is manufactured based on the original manufacturing plan associated with the order. The manufacturing operation is applied towards a second order.

In these illustrative embodiments, an original bill of materials is associated with the order. The original bill of materials is based on a current date when the engineering change becomes effective for at least one material. The alternate bill of materials is based on the specified date when the engineering change becomes effective for at least one material.

The specified date when the engineering change becomes effective for at least one material is based on factors that are not accounted for by the current date when the engineering change becomes effective for at least one material.

The illustrative embodiments further provide a computer implemented method, apparatus, and computer usable program code for processing orders. A request for delivery of an ordered product by a requested delivery date is received. An attempt to manufacture the ordered product is made to determine feasibility of delivery of the ordered product by the requested delivery date before committing to the requested delivery date.

In these illustrative embodiments, either the ordered product is broken down into at least one required material, or at least one required material for producing the ordered product is identified from an existing bill of material. At least one required material has a current date when an engineering change becomes effective for at least one required material. A date when the engineering change becomes effective for at least one required material is specified. A selection is made from the current date and the specified date to make the delivery of the ordered product by the requested delivery date feasible. An attempt to manufacture the ordered product is made based on the specified date.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which illustrative embodiments may be implemented;

FIG. 2 is a block diagram of a data processing system in which illustrative embodiments may be implemented;

FIG. 3 is a typical production flow depicted in a flowchart in accordance with an illustrative embodiment;

FIG. 10 is a flowchart of a modified production process depicted in accordance with an illustrative embodiment.

DETAILED DESCRIPTION OF THE INVENTION

Figure 4:
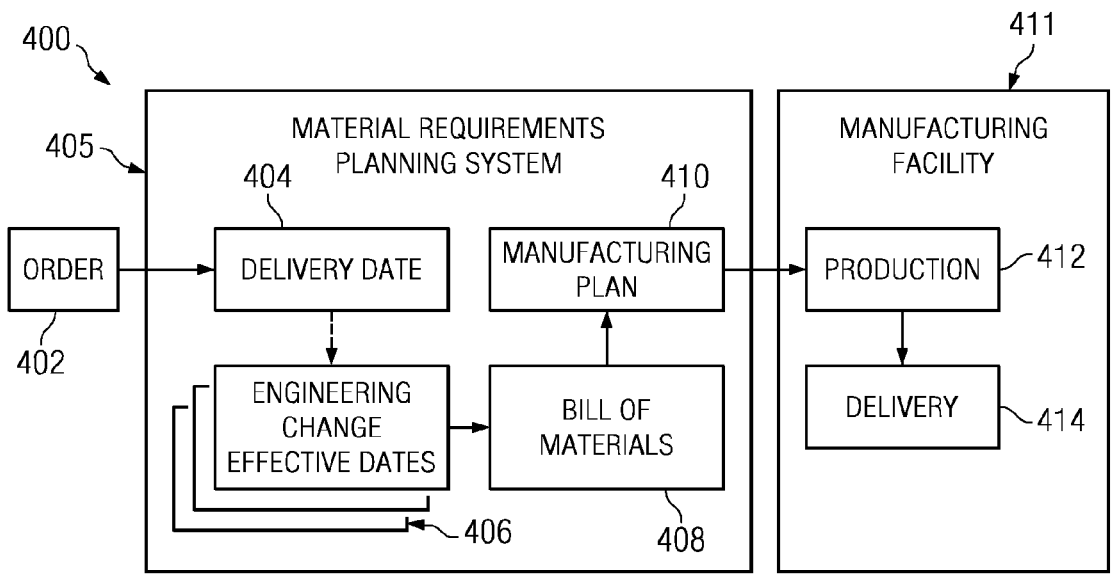
FIG. 4 is a prior art production planning flow depicted in a flowchart in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Various systems used in production process can be implemented using the data processing systems described in FIG. 1. For example, order management system, logistics system, accounting system, and company ledger are some of the systems used in production process that can be implemented using client 110, 112, and 114, or server 104 and 106 in FIG. 1.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A requisition for goods or services, described in terms of exchange of those goods or services for agreed compensation, in a contractual form, is called an order. An order placed by a customer is a customer order. Customer orders commonly contain a delivery date requirement. The delivery date is a date by which the customer expects the ordered goods to be delivered to the customer specified destination and receipt of the goods at that specified destination. An order may have an original delivery date and a requested delivery date. An original delivery date is a delivery date that the manufacturer can promise the delivery by, and that is acceptable by the customer. A requested delivery date is a date that is desired by the customer for the delivery. A requested date is a date different from the original delivery date, and is usually requested after the original delivery date has been promised by the manufacturer and accepted by the customer. Occasionally, a customer may request a requested delivery date simultaneously with acceptance of an original delivery date.

Manufacturing of goods depends upon ordering, planning, and production systems. Such systems are hardware and software systems that interact with each other in the top-down approach to delivery of goods. Order entry systems provide functions that help in ordering goods from manufacturers. Accounting systems, planning systems, warehouse management systems, logistics systems, and numerous other systems, support the production planning process to ensure that the orders are capable of being fulfilled. These systems determine whether orders can be fulfilled based on the buyer's account status, suppliers' inventory levels, manufacturer's own warehouse inventory, quantities on hand, assembly schedule availability, and tooling and personnel availability among other factors.

A material requirements planning system (MRP) determines if an order can be committed to for delivery on the dates as requested. The material requirements planning system runs a "try for fit" process to determine if the requested "commit", that is commitment to a delivery date, can be accommodated in the manufacturing schedule. Commit of a date, whether original delivery date or a requested delivery date, is a promise by the manufacturer to deliver the ordered products to the customer by that date. A delivery date is committed for an order when the promise to deliver by that date has been made by the manufacturer and accepted by the customer. Similarly, a commit date is a date for which a commitment has been made.

The material requirements planning system has to run the "try for fit" process before manufacturing facilities can attempt to manufacture anything. The "try for fit" process is a process by which the material requirements planning system determines if the delivery date is possible given the various manufacturing constraints. Such constraints may be materials availability, manufacturing tooling, personnel availability, and prior committed orders. Assessing delivery date feasibility for complex products in the "try for fit" process can be very difficult without actually attempting to manufacture the complex product. Determining the chances of success in meeting a specified criterion is called determining the feasibility of that criterion. For example, the criterion can be the order's requested delivery date. Determining whether the order can be built and delivered is called determining the feasibility of the requested delivery date.

Professionals in manufacturing industry refer to various sections of industrial facilities by shortened names that reflect their functionality. Manufacturing facilities are called "manufacturing", shipping facilities are called "shipping", and kitting facilities are called "kitting".

Each section of the industrial facility is responsible for specific operational actions to accomplish the overall goal of manufacturing a product. Manufacturing facility undertakes manufacturing operation, which entails actual manufacturing activities such as cutting, joining, shaping, forming, assembling, surfacing, setting, and transforming materials into products or parts of products. Similarly, shipping undertakes shipping operation, which entails crating, scheduling, manifest making, storing, transporting, and tracking of finished products. These examples of manufacturing operations are only illustrative in nature, and are not intended to limit the illustrative embodiment to these descriptions. Operational responsibilities of each section of an industrial facility can be changed depending on the specific requirements of manufacturing a certain product.

Material requirements planning systems have internal engineering change (EC) effective dates for various components necessary for manufacturing. Components may be replaced with corresponding components for future manufacturing. Among several reasons for the substitution, this change may be due to better technology of substitute parts, cheaper substitute parts, or more effective substitute parts. This change is called engineering change. The date on which this change becomes effective is the engineering change effective date. Thus, the engineering change effective date of a component is the date when manufacturing facility is going to change the component to a different version, make, or type. A current engineering change effective date of a component is an engineering change effective date that has been determined using the information for that component in the various systems, and is currently valid.

For materials necessary for manufacturing an order, the material requirements planning system breaks down the order into requisite materials. The term-material-used in the context of an order in this manner, means the various components, supplies, accessories, and consumable items needed for making the ordered product. For example, for an order for a computer, the materials may be a specific motherboard, a processor of a certain specification, a chassis of certain dimensions, a power supply of certain wattage, and number of screws of a certain size to fasten the motherboard to the chassis. A group of one or more materials is a set of materials.

For these materials, the material requirements planning system generates one or more bills of materials (BOM). A bill of materials is a listing of materials needed for an order.

Generating these one or more bills of materials depends on the engineering change effective date and the delivery date for the order. An original bill of materials is a bill of materials generated based on the original delivery date of an order. An alternate bill of materials is an alternative to the original bill of materials generated based on some change in the engineering change effective date or the delivery date. For example, a customer may place an order for a specialized computer requiring a specific type of processor as a component. The processor is a component that may have an associated engineering change date that may reflect when processor version A is to be replaced with processor version B for all future deliveries. If the order's commit date falls after the engineering change date for the processor, the bill of materials for manufacturing the specialized computer will contain processor version B and not version A.

Current processes in material requirements planning systems use the commit date to find engineering change dates and generate a bill of material. Dependency on engineering change dates forces the material requirements planning systems to plan only with components available according to the commit date. In the above example of the specialized computer, the material requirements planning systems is going to plan to manufacture the specialized computer only with processor version B. However, processor version A may be available in inventory due to excess inventory, cancelled orders, and other reasons. The order may be deliverable ahead of time, which the customer may find desirable. Still, the planning engine will not plan with processor version A unless an earlier date is actually committed to for delivery. Current engineering change effective dates do not account for all the factors that can affect over-availability or under-availability of materials in manufacturing. Factors such as excess inventory from inaccurate shipments, left over inventory from a previous miscalculated order, cancelled orders, and inventory available from disassembling returned products for certain materials are some examples that may not be accounted for by the current engineering change effective date.

When a customer requests a different delivery date during the ordering process, usually an earlier delivery date, the requested delivery date has to be committed to, and the material requirements planning system has to go through the entire "try for fit" process with the requested delivery date to determine the feasibility. Similar problems arise when, after an original delivery date has been committed to, the customer requests a delivery date change. This method also poses similar problems when sales force in the field needs an estimated delivery date to close a sale. Presently, if commitment to the requested delivery date is to be avoided prior to the "try for fit" process, the material requirements planning systems must be manually changed to reflect the requested delivery date in numerous places to determine the feasibility of the requested delivery date.

Neither the commitment to the requested delivery date prior to feasibility, nor the numerous manual changes to determine feasibility is desirable. Especially for complex orders, both of these present alternatives can be tedious and error prone. A system that allows the use of alternate manufacturing plans can eliminate these shortcomings in the present alternatives. An alternate manufacturing plan is a manufacturing plan created in addition to an existing manufacturing plan, without replacing or modifying the existing manufacturing plan. The alternate manufacturing plan is created for manufacturing the same product as planned using the existing manufacturing plan, but contains different planning restrictions. For example, an alternate manufacturing plan may be created for production of the same computer as the existing manufacturing plan, but for delivery by a different date. Therefore, a system to enable a manufacturing facility to attempt to manufacture an order on an alternate manufacturing plan without committing to the requested delivery date and without manually changing the material requirements planning system and the original commit date would be useful. Attempting to manufacture based on some criteria means making an effort to manufacture based on those criteria, without making a commitment to deliver the manufactured product according to those criteria. For example, an attempt to manufacture a computer may be made to determine if all components required for manufacturing the computer can be timely received on short notice. If the components are not timely received on short notice, the attempt is deemed a failure and abandoned. On the other hand, if the components are timely received on short notice, the attempt is deemed a success and the manufacturing facility can determine subsequent actions. Accordingly, an attempt to manufacture does not affect the planned manufacturing of the product. The manufacturing facility can undertake an attempt simply to determine whether the effort to manufacture based on some criteria can be successful. Subsequent actions by any of the involved systems can be based on the success or failure of the attempt to manufacture.

With reference now to FIG. 3, a typical production flow is depicted in a flowchart in accordance with an illustrative embodiment. In the depicted currently used production flow 300, order sources 302 generate the orders. Order sources 302 may be implemented in client systems, such as clients 110-114, or server systems, such as servers 104-106 in FIG. 1. Such order sources may be associated with direct customers, web-based ordering systems, sales force taking orders in the field, or other representatives interacting with customers in an ordering process.

Orders received from order sources 302 are entered into order management system 304, which can be implemented in a server, such as server 104 in FIG. 1. Order management system 304 is responsible for managing the processes for order entry, order change, order translation, order history management, and converting customer orders to manufacturing orders. Order management system 304 sends orders to the manufacturing facility to be built for the current configuration, schedule, and customer.

Logistics system 306 provides the management functions for bill of materials maintenance. Material requirements planning systems, inventory management systems, warehouse management systems, production planning systems, procurement systems, and finance and costing systems comprise logistics system 306. Logistics system 306 can be implemented in a server, such as server 104 in FIG. 1. Logistics system 306 computes the materials required, checks inventories, generates the bill of material, and generates plans for manufacturing. After this computation, logistics system 306 sends the manufacturing order to floor control system 308 for production with the current effective bill of materials. The current effective bill of materials are bill of materials that have been generated taking into account the committed original delivery date, and engineering change effective dates for the required components. The engineering change effective date is the date the engineering change becomes effective for a component.

Floor control system 308 can be implemented in a server, such as server 104 in FIG. 1. Floor control system 308 provides support for production order management functions, kitting, building, testing, and preloading of the ordered product. In this process, manufacturing facility consumes inventory. Logistics system 306 keeps track of inventory levels and communicates with suppliers 310 for reordering components. Logistics system 306 also communicates with company ledger 312 and accounting systems to keep track of costs of manufacturing and costs of inventory consumed. Suppliers 310 and company ledger 312 are systems implemented in client systems, such as clients 110, 112, and 114, or server systems, such as servers 104 and 106 in FIG. 1.

Floor control system 308 manages containerizing the finished product and sending to shipping. Floor control system 308 also manages planning for any required rework, as well as deconfiguration of return items. Deconfiguration of a product means that a product is taken apart.

Shipping system 314 takes the finished product from floor control system 308 and carries out the shipping functions. Shipping system 314 can be implemented in a server, such as server 104 in FIG. 1. Shipping system 314 manages weighing, dimensioning, casing, and labeling of goods for shipping. Shipping system 314 also prepares shipping manifests and any import/export documentation. The product is then shipped to customer 316.

Once shipping is completed, the shipping system converts the order into finished goods, closes the order, and informs the order management system of the order status. Note that the various systems described in FIG. 3 can be separate systems, or can be separate components of a common system. Further, these systems can co-reside on a single server, such as 104 in FIG. 1, or a single client, such as 112 in FIG. 1. Alternatively, these systems can also be distributed across multiple clients and servers interconnected with each other using communication devices, such as telephony networks or data communication networks.

With reference now to FIG. 4, a currently used production planning flow is depicted in a block diagram in accordance with an illustrative embodiment. In the depicted currently used production planning flow 400, order 402 comes in, preferably from an order management system, such as order management system 304 of FIG. 3. The order contains delivery date 404. Material requirements planning system 405, such as a material requirements planning system in logistics system 306 in FIG. 3, identifies and uses delivery date 404 for production planning. Based on delivery date for order, material requirements planning system determines engineering change effective dates 406 for the components required for producing the ordered product.

Once engineering change effective dates for components are identified, the material requirements planning system generates bill of materials 408 for the components. Material requirements planning system 405 uses bill of materials 408 to generate manufacturing plan 410, taking into account manufacturing requirements such as availability of tooling and personnel. Manufacturing facility 411 executes production 412 based on manufacturing plan 410, resulting in delivery of the ordered product 414.

Figure 5:
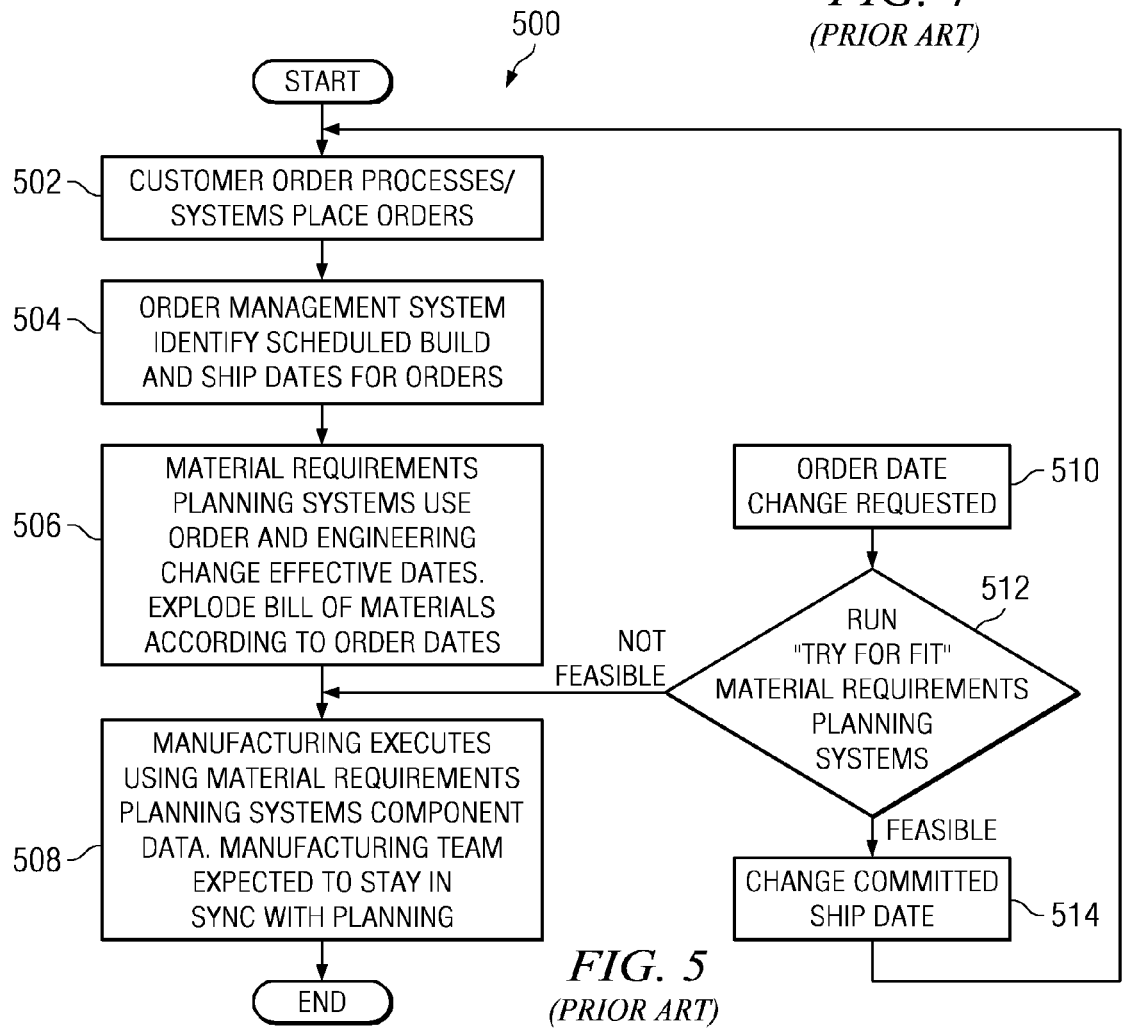
FIG. 5 is a prior art "try for fit" process depicted in a flowchart in accordance with an illustrative embodiment.

With reference now to FIG. 5, a flowchart of a currently used "try for fit" process is depicted in accordance with an illustrative embodiment. This process is implemented in a material requirements planning system, such as material requirements planning system 405 in FIG. 4, or material requirements planning system as included in logistics system 306 in FIG. 3. In the depicted currently used "try for fit" process 500, customer order processes, such as order sources 302 of FIG. 3, place an order for products in the desired configuration (step 502). Order management systems, such as order management system 304 in FIG. 3, receive the order for products. For example, in an order for a specialized computer, the desired configuration would specify processor type and speed, memory type, size and speed, disk space and configuration, and other similar requirements.

Upon receipt, the customer order is scheduled for production and delivery. Scheduling results in build dates and a commitment for delivery date or ship date (step 504). Order management systems input the committed delivery date for the order and the engineering change effective dates for the required components into material requirements planning system (step 506). Material requirements planning system generates bill of materials for production based on these dates (step 506). A manufacturing facility, such as manufacturing facility 411 in FIG. 4, executes production based on bill of materials and committed delivery date (step 508).

When a customer requests a change in delivery date for any reason, the process receives the request for change in delivery date (step 510). Next, the material requirements planning system runs a "try for fit" process to determine if the requested delivery date is feasible with available components according to the engineering change effective dates (step 512). If the "try for fit" process reflects that the requested delivery date is not feasible ("not feasible" path), no changes are made to the committed delivery date in any system, and production proceeds as originally planned (step 508).

If, however, the requested delivery date is feasible ("feasible" path), the material requirements planning system changes the committed delivery date to reflect the requested delivery date as the new committed delivery date (step 514). Material requirements planning system communicates this change in committed delivery date to customer order processes.

The logistics system, such as 306 in FIG. 3, and floor control system, such as 308 in FIG. 3, re-plan steps 502-508 with the requested delivery date as the new committed delivery date. However, manufacturing does not begin unless a delivery date, whether original, or requested, has been committed.

This restraint on manufacturing facility is problematic, especially for complex orders. As described above, feasibility of a requested delivery date for a complex order is difficult to determine using this prior art process. Customer dissatisfaction, cancelled orders, and embarrassment result if the manufacturing facility finds that the requested delivery date is not feasible after they have been committed to.

Figure 6:
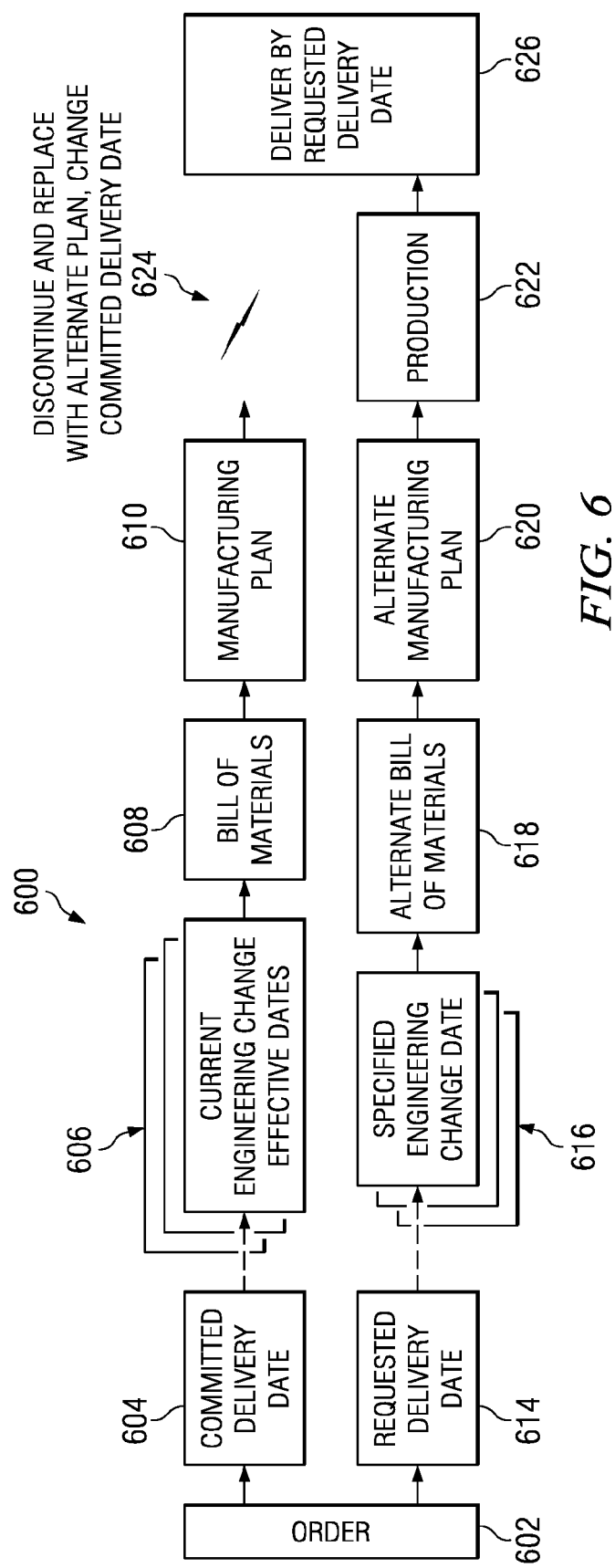
FIG. 6 is a flowchart for production planning flow in accordance with an illustrative embodiment.

With reference now to FIG. 6, a block diagram of a production planning flow is depicted in accordance with an illustrative embodiment. In depicted novel production planning flow 600, the original production planning process based on original committed delivery dates is similar to the process depicted in FIG. 4.

Order 602 comes in, preferably from an order management system, such as order management system 304 of FIG. 3. The order contains committed delivery date 604, which has been committed. Material requirements planning system, such as material requirements planning system in logistics system 306 in FIG. 3 uses the committed delivery date for production planning. Based on committed delivery date for order, material requirements planning system determines current effective engineering change effective dates 606 for the components required for producing the ordered product. Next, material requirements planning system generates bill of materials 608 for these components. Manufacturing facility uses bill of materials 608 to generate manufacturing plan 610, taking into account manufacturing requirements such as availability of tooling and personnel. Manufacturing facility would normally execute production based on manufacturing plan 610, resulting in the delivery of the ordered product.

The remaining steps of FIG. 6 are contrasted with the prior art process as shown in FIG. 5. When a customer requests a change in the delivery date in the process of FIG. 5, a commitment for the requested delivery date is required before the bill of materials is generated and manufacturing facility can proceed to manufacture and deliver the product by the requested delivery date. The currently used "try for fit" process, as shown in FIG. 5, does not allow for execution of independent build activities on orders with different bill of materials based on different engineering change effective dates. In other words, manufacturing facility presently cannot attempt to build an ordered product in an attempt to deliver by the new requested delivery date without having to go through the commitment process for the requested delivery date. The current process stipulates that future orders should have future content. As a result, no provisions exist for allowing manufacturing facility to build future orders with presently available materials. The ability to group parts that are presently engineering change effective, and to fulfill a future order without having to change the committed delivery date, is a concept that is absent in the current production process.

Continuing with the description of remaining steps of FIG. 6, exemplary illustration described herein includes steps that handle a change request for a delivery date without requiring committing to the requested delivery date. A customer requests a change in delivery date 614. A new process in material requirements planning system, such as material requirements planning system in logistics system 306 in FIG. 3, specifies engineering change effective dates 616 for the parts identified from the original order. For example, suppose that the order was committed for delivery three months from the date of order. Further, suppose that the order requires a processor, and the original bill of materials was based on processor version B whose engineering change effective date is two months away from the date of order. When the customer requests a delivery date six weeks from the date of order, an engineering change effective date of one day after the date of order may be specified for processor version A, so that manufacturing facility can attempt to build and deliver the order with presently available processor version A. Specifying an engineering change effective date outside of the material requirements planning system allows manufacturing facility to try to meet the requested delivery date without actually having to commit to the requested delivery date before assessing the date's feasibility.

The material requirements planning system generates alternate bill of materials 618 based on requested delivery date and specified engineering change effective date. Alternate bill of materials 618 is generated in the same manner as the original bill of materials, such as bill of materials 608. The same workflow processes existing within material requirements planning system are used for the original, as well as alternate bill of materials. These workflow processes use the committed delivery date and the current engineering change effective date to generate the original bill of material. These workflow processes use the requested delivery dates and the specified engineering change effective dates to generate the alternate bill of material.

Original manufacturing plan, such as manufacturing plan 610, is based on the original bill of materials. Alternate manufacturing plan 620 is based on alternate bill of materials 618, and manufacturing facility executes production 622 from this alternate manufacturing plan 618. Alternate manufacturing plan is generated in the same manner as the original manufacturing plan. The same workflow processes existing within material requirements planning system are used for the original as well as alternate manufacturing plans. These workflow processes use the original bill of materials to generate the original manufacturing plan; and use the alternate bill of materials to generate the alternate manufacturing plan.

If manufacturing facility realizes that the order can be built and delivered by requested delivery date, the original manufacturing plan based on the original committed delivery date is replaced 624 by the alternate manufacturing plan 620. The requested date is committed as the new delivery date. The order is built and shipped as before, only that manufacturing facility builds and ships using the alternate manufacturing plan. This results in delivery 626 by the requested delivery date. Thus, manufacturing facility can attempt to deliver on a new delivery date, and does not have to commit to the new delivery date without running feasibility. As a result, risk of embarrassment by failing to deliver by the new delivery date is avoided.

If manufacturing facility determines that the new requested delivery date is not feasible after partially building the order, nothing needs to be undone from the original manufacturing plan, and manufacturing facility can still proceed according to the original manufacturing plan based on the original committed delivery date and current engineering change effective dates. In such a case, the work expended in attempting delivery by the requested date can be applied towards another order later.

Figure 7:
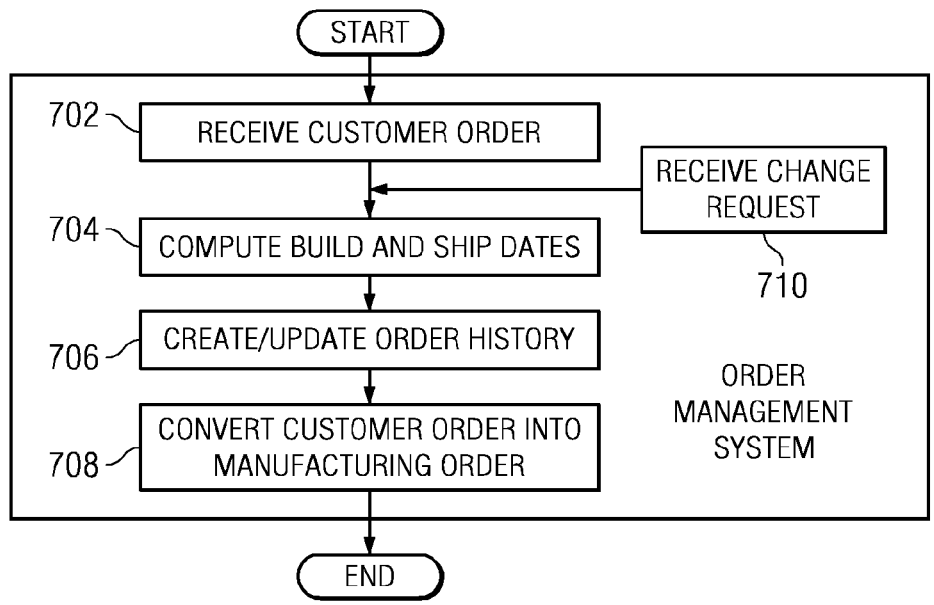
FIG. 7 is a flowchart of a currently used order management process in accordance with an illustrative embodiment.

With reference now to FIG. 7, a flowchart of an order management process is depicted in accordance with an illustrative embodiment. This process is implemented in an order management system, such as order management system 304 in FIG. 3. In the depicted order management process, the process receives a customer order (step 702). A customer order is an order placed by customer order processes, such as order sources 302 of FIG. 3, or any other order entry mechanism that accepts an order from a customer.

Next, the process computes build date and ship date for the order based on committed delivery date (step 704). A build date is a date by which manufacturing facility has to begin building the product contained in the customer order. A ship date is a date by which the finished product has to be shipped out for the customer to receive by the committed delivery date.

Next, for a new customer order, the process creates an order history (step 706). If the process is managing an update or change to an order after the order has been received, the process updates the order history.

The order management process then converts the customer order to a manufacturing order with the process ending thereafter (step 708). A manufacturing order is a version of the customer order that manufacturing processes can understand. For example, a customer order may specify a computer's specifications in terms of processor speed, memory size, and power supply wattage. A corresponding manufacturing order may specify the ordered computer in terms of part names or part numbers for processor of the specified speed, memory of the specified size, and power supply of the specified wattage. This is one example of how the manufacturing order provides manufacturing related information for the customer specified product in the customer order.

The process can receive a change request after having received the customer order (step 710). A change request for an order is a request for changing one or more characteristics of an order placed earlier. For example, a customer may make a change request to change the delivery date, the form of payment, or to change the specification of the ordered product. A change request may also be internal. For example, one of the several planning and production systems may request a change. An equivalent part may need to be substituted for the originally planned part, or an order may have to be delayed for delivery due to disruption in supply chain. The process manages the change request received in step 710 by processing the change request through steps 704-708.

The above-described order management process is only an illustrative example. Several alternative implementations of the order management process are possible for accepting the same inputs and yielding the same outputs. An order management process, such as the process described in FIG. 7, is used in the production planning flow described in FIG. 6.

Figure 8:
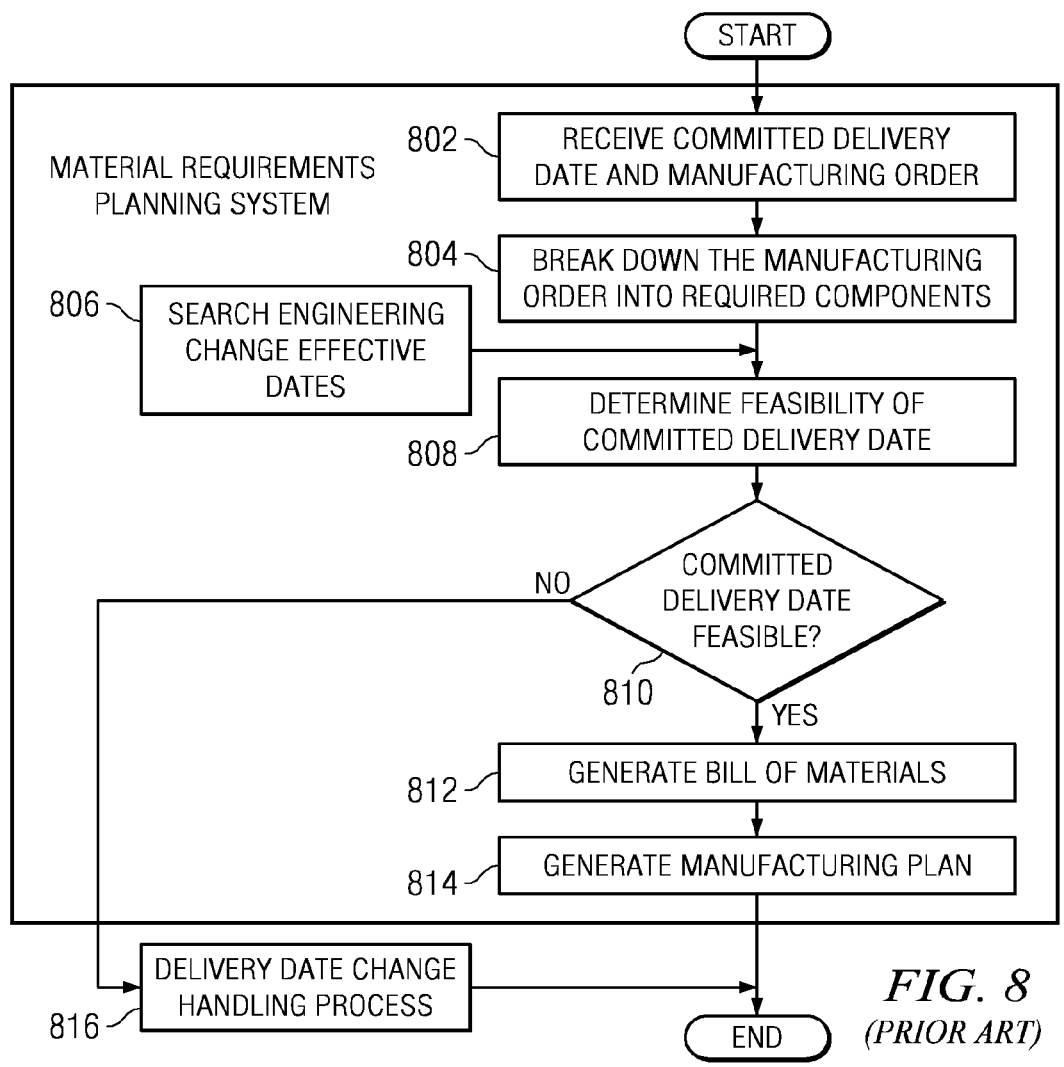
FIG. 8 is a flowchart of a currently used material requirements planning process in accordance with an illustrative embodiment.

With reference now to FIG. 8, a flowchart of a material requirements planning process without the benefit of specified engineering change effective dates is depicted in accordance with an illustrative embodiment. This process is implemented in a material requirements planning system, such as material requirements planning system 405 in FIG. 4 or material requirements planning system as included in logistics system 306 in FIG. 3. In the depicted material requirements planning process, the process receives a manufacturing order along with a committed delivery date for the manufacturing order (step 802). The process breaks down the manufacturing order into required components (step 804). For these components, the process searches and finds engineering change effective dates (step 806).

Next, the process determines the feasibility of the committed delivery date based on the engineering change effective dates (step 808). The process then evaluates the feasibility of the committed delivery date (step 810). If the committed delivery date is feasible ("yes" path of step 810), the process generates bill of materials for the required components (step 812). A bill of materials is a listing of materials, such as components, services, and anything else needed for fulfilling an order. A bill of materials may include the source information for such materials, such as supplier information, warehouse tracking information, part numbers, quantities required, and required-by-date. Different implementations of bill of materials include additional information, or exclude information listed above, as necessary.

Next, the process generates a manufacturing plan (step 814). A manufacturing plan is a scheduling and planning of manufacturing resources, including tooling and personnel, to manufacture the ordered product. Various implementations of manufacturing plans may include additional information on the manufacturing plan.

The process may not find the committed delivery date to be feasible ("no" path of step 810). In such a case, the process hands off control to another process responsible for handling delivery date changes (step 816). The process terminates thereafter.

FIGS. 7-8 describe processing steps and order of those processing steps only as an illustrative example. Various implementations of order management processes and material requirements planning processes exist that perform additional steps, or exclude some described steps. Such implementations can also perform the described steps in different orders, or perform them in different systems and sub-systems. Implementations of order management processes and material requirements planning processes are configurable according to the needs of the specific manufacturing environment where such processes are implemented.

Figure 9:
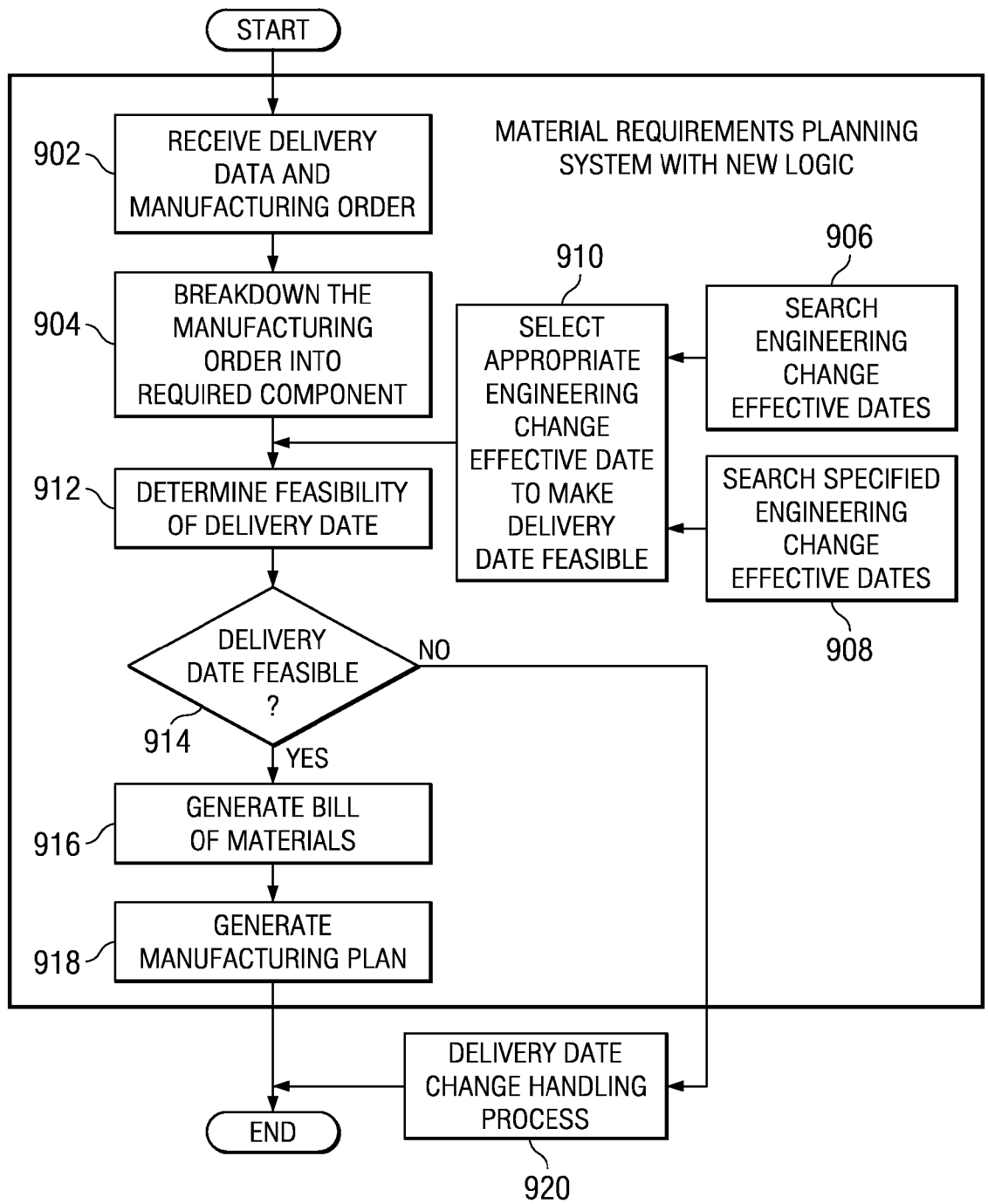
FIG. 9 is a flowchart of a modified material requirements planning process in accordance with an illustrative embodiment.

With reference now to FIG. 9, a flowchart of a modified material requirements planning process is depicted in accordance with an illustrative embodiment. This process is implemented in a material requirements planning system, such as material requirements planning system 405 in FIG. 4 or material requirements planning system as included in logistics system 306 in FIG. 3. In the depicted modified material requirements planning process, the process receives a manufacturing order along with a delivery date for the manufacturing order (step 902). The delivery date may be the committed delivery date or a requested delivery date. The process breaks down the manufacturing order into required components (step 904). For these components, the process searches and finds engineering change effective dates (step 906).

The process also searches for specified engineering change effective dates for the components required for the order (step 908). Specified engineering change effective dates are engineering change effective dates that can be specified manually or programmatically, for overriding current engineering change effective dates. The process selects the appropriate engineering change effective dates from the two types of engineering change effective dates searched in steps 906 and 908 (step 910). The process makes this selection so that the delivery date will be feasible. Due to the flexibility introduced in the material requirements planning process from the specification and selection of engineering change effective dates, the system can assess feasibility of committed delivery dates as well as requested delivery dates. This flexibility allows for determining feasibility of a requested delivery date without having to commit to the requested delivery date. In this manner, manufacturing facility gets the opportunity to build the product by specifying engineering change effective dates overrides.

Next, the process determines the feasibility of the delivery date based on the engineering change effective dates (step 912). The process then evaluates the feasibility of the committed delivery date (step 914). If the delivery date is feasible ("yes" path of step 914), the process generates bill of materials for the required components (step 916). Next, the process generates a manufacturing plan (step 918). The process terminates thereafter.

The flexibility of steps 908-910 allows making a delivery date feasible without committing. However, a delivery date may not be feasible when the delivery date cannot be made feasible by any specification of engineering change effective dates. If the committed delivery date is not feasible, the process may not find the committed delivery date to be feasible ("no" path of step 914). In such a case, the process hands off control to another process responsible for handling delivery date changes (step 920). The process terminates thereafter.

With reference now to FIG. 10, a flowchart of a modified planning process is depicted in accordance with an illustrative embodiment. This process is implemented in a material requirements planning system, such as material requirements planning system 405 in FIG. 4, or material requirements planning system as included in logistics system 306 in FIG. 3. In the depicted modified planning process 1000, an order management system, such as order management system 304 of FIG. 3, receives the order for products from customer order processes (step 1002). Customer order processes are processes and systems, such as order sources 302 of FIG. 3, which enable customers for placing orders and specifying configurations of the ordered products. Upon receipt, the order management system schedules the customer order for production and delivery (step 1004). This scheduling activity results in build dates and a commitment for delivery date or ship date. The committed delivery date for the order and the engineering change effective dates for the components required to manufacture the product are input into material requirements planning system. New logic in material requirements planning system is used for selecting appropriate engineering change effective dates to use for production (step 1006). The engineering change effective dates can be chosen from the actual current engineering change effective dates, specified engineering change effective dates, or some combination of the two. A specified engineering change effective date is an override of the corresponding current engineering change effective date for a specific component.

A material requirements planning system generates a bill of materials for production based on the selected engineering change effective dates. Orders that have engineering change effective dates other than the current engineering change effective dates are flagged as upside-potential opportunities in manufacturing facility (step 808). Such flagged orders are called "opportunity" in the manufacturing industry. Flagging of an order in this manner means that an order is an "opportunity".

Orders that are not flagged are built and delivered according to the process shown in FIG. 5 (step 1010). For orders that are flagged in step 1008, manufacturing facility determines if the order can be built and delivered by the requested delivery date (step 1012). If the requested delivery date cannot be met, the original committed date and manufacturing plan based on that date are executed and the work expended in chasing the "opportunity" is re-used in another order (step 1014).

If, however, the requested delivery date is feasible, the date is set as the new delivery date (step 1016), and the manufacturing planning proceeds according to the current process with the new delivery date. Current processes can then be followed to build, ship, and close the order using the updated delivery date.

While following the production process for orders that are not flagged as "opportunity" in step 1010, a customer can request a change in delivery date (step 1018). In such cases, the new logic in material requirements planning system can be used for selecting an appropriate engineering change effective date to use for production (step 1006). In this manner, the change request is either rejected, if not feasible, or treated and flagged as an "opportunity".

Similarly, a field order can use the new logic in material requirements planning system for determining whether the field order is an "opportunity" (step 1020). A field order is a request from the sales force, field sales systems or any order taking mechanism, for information needed before an order is taken. For example, a field order may be a request for estimated delivery date by a sales representative who may be working with a customer to get an order.

The field order may only require an estimated delivery date while the order is being discussed with a customer. In such cases, a field order can be created in step 1020 only to determine an estimated delivery date using the process starting at step 1006. If, on the other hand, the field order is ready to be processed as an order, the field order is created in step 1020 and sent through the process starting at step 1002.

The illustrative embodiments describe a process for specifying engineering change effective dates outside of the material requirements planning system. Specified engineering change effective dates allow the manufacturing facility to try to meet the requested delivery date without actually having to commit to the requested delivery date before assessing the date's feasibility. Manufacturing facility can proceed to manufacture the product with an alternate bill of materials based on the specified engineering change effective dates. Risk of non-delivery is minimized because the commitment to the requested delivery date is made after the manufacturing facility has assessed the feasibility of the requested delivery date. Using this process, the manufacturing facility can also provide more reliable delivery date estimates for field orders. In this manner, the illustrative embodiments improve upon the prior art process which requires commitment to a requested delivery date before the manufacturing facility can determine feasibility of that date.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing orders, the computer implemented method comprising:

receiving a request for delivery of an order by a requested delivery date;

responsive to receiving the request for delivery of the order by the requested delivery date, specifying a date when an engineering change becomes effective for at least one material required for the order outside of a material requirements planning system, wherein the specified date when the engineering change becomes effective for the at least one material is the date when a manufacturing operation changes from the at least one material to a different version of the at least one material based on factors not accounted for by a current date when the engineering change becomes effective for the at least one material, and wherein the specified date when the engineering change becomes effective for the at least one material is specified manually or programmatically for overriding the current date;

creating an alternate bill of materials based on the specified date when the engineering change becomes effective;

creating an alternate manufacturing plan based on the alternate bill of materials for delivery of the order by the requested delivery date; and initiating the manufacturing operation based on the alternate manufacturing plan.

2. The computer implemented method of claim 1, wherein the order has an original delivery date, and wherein the requested delivery date is earlier than the original delivery date.

3. The computer implemented method of claim 1, wherein the specifying and creating steps are performed by a component responsible for material requirements planning, and the initiating step is performed by a component responsible for manufacturing.

4. The computer implemented method of claim 1, wherein the order has an original delivery date, and wherein if the manufacturing operation can be completed by the requested delivery date, the requested delivery date is committed for the order and the original delivery date is updated with the requested delivery date.

5. The computer implemented method of claim 4, wherein an original manufacturing plan is associated with the order, and wherein if the alternate manufacturing operation cannot be completed by the requested delivery date, the original delivery date is left unchanged, the order is manufactured based on the original manufacturing plan, and the manufacturing operation is applied towards a second order.

6. The computer implemented method of claim 5, wherein if the manufacturing operation can be completed by the requested delivery date the original manufacturing plan is replaced with the alternate manufacturing plan.

7. The computer implemented method of claim 4, wherein an original bill of materials is associated with the order, and wherein the original bill of materials is based on the current date when the engineering change becomes effective for the at least one material, and the alternate bill of materials is based on the specified date when the engineering change becomes effective for the at least one material.

8. The computer implemented method of claim 1, wherein the order is one of a customer order and a field order.

9. A computer implemented method for processing orders, the computer implemented method comprising:

receiving a request for delivery of an ordered product by a requested delivery date;

performing one of breaking down the ordered product into at least one required material, and identifying at least one required material for producing the ordered product from an existing bill of material;

having a current date when an engineering change becomes effective for the at least one required material, and specifying a date when the engineering change becomes effective for the at least one required material outside of a material requirements planning system, wherein the specified date when the engineering change becomes effective for the at least one material is the date when a manufacturing operation changes from the at least one material to a different version of the at least one material based on factors not accounted for by the current date when the engineering change becomes effective for the at least one material, and wherein the specified date when the engineering change becomes effective for the at least one material is specified manually or programmatically for overriding the current date;

selecting the specified date when the engineering change becomes effective for the at least one material to make the delivery of the ordered product by the requested delivery date feasible; and attempting to manufacture the ordered product to determine feasibility of delivery of the ordered product by the requested delivery date based on the specified date when the engineering change becomes effective for the at least one material before committing to the requested delivery date.

* * * * *